No. 699,579. Patented May 6, 1902.
H. L. SCHAFFNER.
BRAKE.
(Application filed Oct. 24, 1901.)
(No Model.) 2 Sheets—Sheet 2.
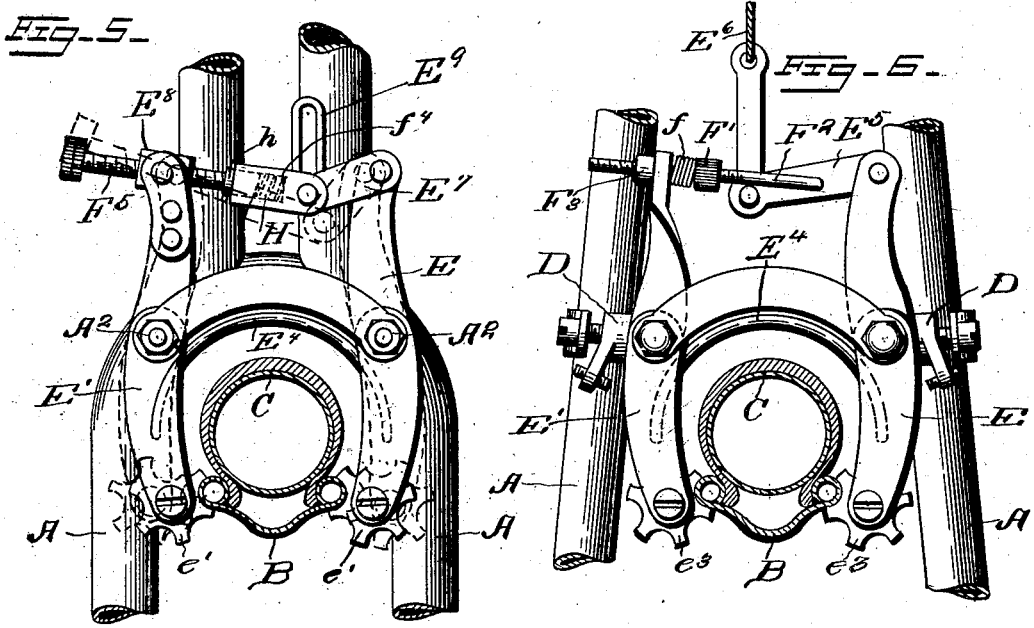
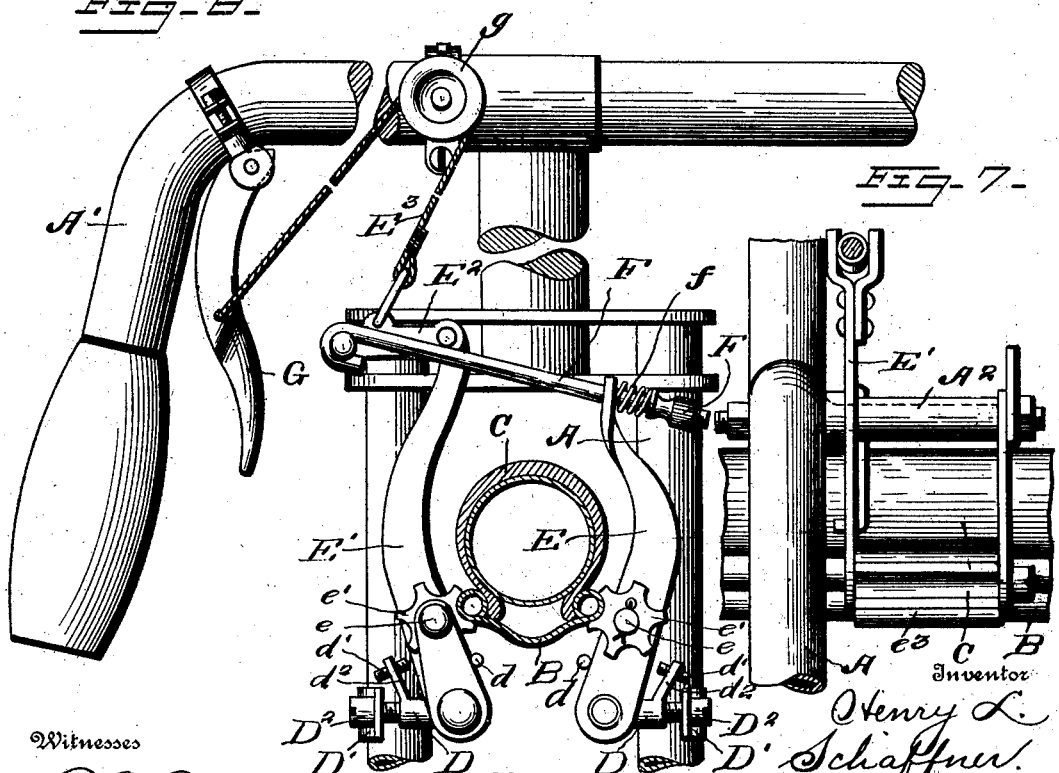
Witnesses
R. A. Boswell
James R. Mansfield
Inventor
Henry L. Schaffner
By
Alexander & Fowell
Attorneys

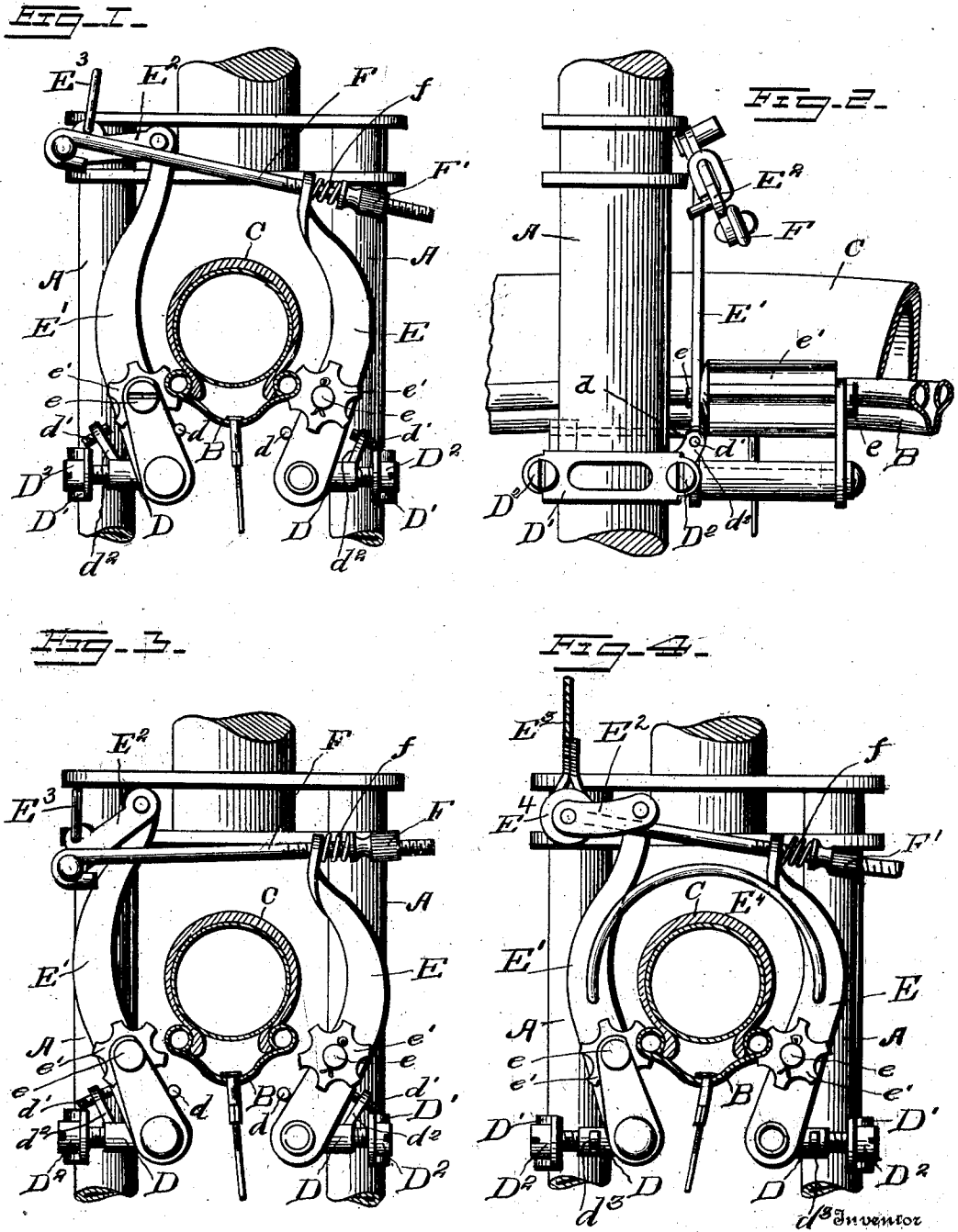

UNITED STATES PATENT OFFICE.

HENRY LOUIS SCHAFFNER, OF FLORENCE, ITALY.

BRAKE.

SPECIFICATION forming part of Letters Patent No. 699,579, dated May 6, 1902.

Application filed October 24, 1901. Serial No. 79,865. (No model.)

*To all whom it may concern:*

Be it known that I, HENRY LOUIS SCHAFFNER, of Florence, Italy, have invented certain new and useful Improvements in Brakes; and I hereby declare that the following is a full, clear, and exact description thereof, reference being had to the accompanying drawings, which form part of this specification.

This invention is an improvement in brakes especially designed for use in connection with bicycles, motor-vehicles, and other vehicles having pneumatic or cushion tires, one of its objects being to brake the wheel effectually by engaging the rim or felly of the wheel instead of the pneumatic tire.

Another object is to so construct the brake that by a slight application of power a quick but very powerful application of the brake may be obtained.

In the present invention the multiplication of power is obtained by a combination of levers attached to and forming a part of the brake itself.

I have shown the invention as adapted to bicycles; but obviously the brake can be applied to other forms of vehicles and to other machines and is not restricted to the application herein shown.

The claims summarize the essential features of the invention concisely, and I will now proceed to describe the embodiments of the invention illustrated in the accompanying drawings, which will impart a clear understanding of the essential features of the invention; but I do not confine myself to the construction and arrangement shown in drawings except where the same is specifically set forth in the claims.

In said drawings, Figure 1 is a front view of the invention as a bicycle-brake clamping the rim of the front wheel. Fig. 2 is a side view of the same. Fig. 3 is a front view thereof with brake released. Figs. 4 and 5 are front views of slightly-modified forms of the brake. Fig. 6 is a front view of a slightly-different form of brake, better adapted to rear wheels. Fig. 7 is a side view of Fig. 6. Fig. 8 is a view showing the hand operating device for the brake.

As shown in Figs. 1, 2, 3, A designates the fork or frame of a bicycle; B, the wheel rim or felly; C, the pneumatic or cushion tire attached to the wheel-rim. To the opposite members of the fork A are attached removable clamps, each composed of an inner part D and an outer part D', connected by screws $D^2$. To the inner parts D are pivoted the lower ends of opposite brake-levers E E', which are provided with projecting studs $e$, on which are secured fluted friction-shoes $e'$, that are adapted to engage the opposite edges of the wheel-rim B when the upper ends of the levers are drawn toward each other, as in Fig. 1, such movement of the levers applying the brake and the reverse or separating movement of the levers releasing it. To the upper end of lever E' is pivoted one end of a link $E^2$, the other end of which is pivotally connected to a rod F, that extends to and through an opening in the upper end of lever E and is confined by a nut F', which is tapped on the threaded end of rod F, as shown. Preferably an expansion-spring $f$ is interposed between nut F' and upper end of lever E, as shown. A pull rod, cord, or chain is attached to link $E^2$ and leads to a suitable hand-lever or other actuating device. As shown, a cord $E^3$ is led from link $E^2$ up to a hand-lever G, attached to the handle-bar A', said cord passing over a guide-pulley $g$ at a suitable point above the brake. The levers E E' are forced apart by suitable springs. As shown in Figs. 1 and 2, bar-springs $d$ are attached to parts D of the clamps and press the levers outwardly. The separating movement of the levers is limited by adjustable screw-stops $d'$, tapped through lugs $d^2$ on parts D, as shown.

In Fig. 4 the construction is substantially the same as in Fig. 1, but the levers are separated by a bow-spring $E^4$, and the outward movement of the levers is arrested by lugs $d^3$, and link $E^2$ is provided with a roller $E^4$, around which the pull-cord $E^3$ runs.

In the construction shown in Figs. 5, 6, and 7 the brake is applied by forcing the upper ends of levers apart, the brake-shoes being attached to the lower ends of the levers, below the pivots thereof, instead of being attached above their pivots, as in Figs. 1 to 4.

As shown in Figs. 6 and 7, the levers E E' are pivoted near their centers on blocks or clamps D. To their lower ends are attached brake-shoes $e^3$, which are adapted to press against the rim B of the wheel below the pneumatic or cushion tire. A link $E^5$ is pivoted to the upper end of lever E, and to said link and about midway of its length is pivotally connected one end of a rod $F^2$, which extends through an opening in the upper end of lever $E'$, a nut $F'$ and spring $f$ being placed on the rod, so as to force lever $E'$ against an adjustable stop-nut $F^3$ on the rod. The free end of link $E^5$ is connected to the pull-chain $E^6$, so that when the latter is drawn upwardly the upper ends of levers E $E'$ will be forced apart and the brake applied.

In Fig. 5 rotatable brake-shoes $e'$ are attached to the lower ends of the levers and are adapted to engage opposite sides of the rim B when the upper ends of the levers are forced apart. In this case the levers are pivoted on pins $A^2$, projecting from the fork or frame A, and the lower ends of the levers are forced apart by a bow-spring $E^4$. The upper ends of the levers are united by a connection formed of a link $E^7$ and rod $F^5$, which is tapped through a rocking nut $E^8$ in the upper end of lever $E'$, and its inner end rotatably engages a block $h$ in a socket-piece H, pivoted to the end of link $E^7$, said block being pressed outwardly by a spring $f^4$. The pull $E^9$ is attached to the pivot connection of the block and link.

It will be observed that the link and rod form an extensible connection between the upper ends of the brake-levers in all the figures, one member of this connection being short, the other long. When this connection is relaxed, as in Figs. 3, 5, and 6, the brake is released; but when the connection is extended, as in Figs. 1 and 4, the brake is applied. To extend the connection, very little power is required, and if the short member of the connection be swung something less than a quarter of a revolution on its pivot the full power of the brake will be realized. In other words, when the pivot or joint of the two members of the connection (to wit, $E^2$ and F in Figs. 1 and 4, $E^5$ and $F^2$ in Fig. 6, and $F^5$ and $E^7$ in Fig. 5) comes into alinement with the pivots or joints between the members of the connection and the opposite brake-levers then the brake will be applied with greatest pressure, and comparatively little force is required to bring the parts into brake-applying position.

The springs $f f^4$ are useful to compensate for any slight irregularities in the rim of the wheel when brakes are released and to prevent rattling of parts.

Having thus described my invention, I claim—

1. The combination of the wheel, brake-levers pivoted on opposite sides thereof, and brake-shoes carried by said levers; with a connection composed of a short and a long member respectively connected to the free ends of the opposite levers, the joint between one member of the connection and one lever being adjustable, and means for extending the connection, substantially as described.

2. The combination of the wheel, the brake-levers pivoted on opposite sides thereof, the stops for limiting the releasing movement of the levers, the link pivoted to one lever, a rod pivotally connected to the link and transfixing the other lever, an adjusting-nut on the rod, a spring interposed between the rod and lever, a pull connected to the link, and a spring for separating the levers, substantially as described.

3. The combination of the wheel, the clamps on opposite sides thereof, the brake-levers pivoted on the clamps limiting the releasing movement of the levers, the brake-shoes attached to the levers above their pivots, a link pivoted to one lever, an adjustable rod pivotally connected to the link and connecting it with the other lever, and a spring for separating the levers, substantially as described.

In testimony that I claim the foregoing as my own I affix my signature in presence of two witnesses.

HENRY LOUIS SCHAFFNER.

Witnesses:
SPIRITO BENNORRO,
J. QUINCY CARPENTER.